United States Patent
Schuck

(10) Patent No.: US 6,644,761 B2
(45) Date of Patent: Nov. 11, 2003

(54) TOWED VEHICLE BRAKE ACTUATION SYSTEM

(76) Inventor: John Robert Schuck, 101 N. Governor St., Evansville, IN (US) 47711

( * ) Notice: Subject to any disclaimer, the term of this patent is extended or adjusted under 35 U.S.C. 154(b) by 0 days.

(21) Appl. No.: 10/006,152

(22) Filed: Oct. 22, 2001

(65) Prior Publication Data

US 2003/0075972 A1 Apr. 24, 2003

Related U.S. Application Data

(60) Provisional application No. 60/302,486, filed on Jul. 2, 2001, provisional application No. 60/287,952, filed on May 1, 2001, and provisional application No. 60/244,163, filed on Oct. 28, 2000.

(51) Int. Cl.[7] ............................................... B60T 7/20
(52) U.S. Cl. .................... 303/123; 303/7; 303/24.1; 188/112 A
(58) Field of Search ............................. 303/3, 7, 12, 15, 303/20, 123, 124, 183, 24.1; 188/3 H, 3 R, 112 A, 112 R

(56) References Cited

U.S. PATENT DOCUMENTS

| | | | | |
|---|---|---|---|---|
| 3,497,266 A | * | 2/1970 | Umpleby .......................... 303/3 |
| 3,601,564 A | * | 8/1971 | Ellison ...................... 200/61.48 |
| 3,779,612 A | * | 12/1973 | Tschannen ................... 303/123 |
| 3,909,075 A | * | 9/1975 | Pittet et al. ................. 303/24.1 |
| 3,990,749 A | * | 11/1976 | Mizen et al. ............... 303/24.1 |
| 4,196,936 A | * | 4/1980 | Snyder .......................... 303/20 |
| 5,403,073 A | * | 4/1995 | Frank et al. ..................... 303/7 |
| 5,411,321 A | * | 5/1995 | Harness ........................... 303/7 |
| 5,431,253 A | * | 7/1995 | Hargrove .................... 188/3 H |
| 5,823,637 A | * | 10/1998 | Blue ................................ 303/7 |
| 5,911,483 A | * | 6/1999 | Overhulser ...................... 303/7 |
| 6,087,777 A | * | 7/2000 | Long ............................ 315/82 |
| 6,126,246 A | * | 10/2000 | Decker, Sr. et al. ............. 303/7 |
| 2002/0030405 A1 | * | 3/2002 | Harer et al. |

FOREIGN PATENT DOCUMENTS

GB 2270548 A * 3/1994

OTHER PUBLICATIONS

Patent Application Publication US 2002/0030405 A1 to Harner et al.*

* cited by examiner

Primary Examiner—Jack Lavinder
Assistant Examiner—Melody M. Burch

(57) ABSTRACT

A towed vehicle brake actuation system comprising an adjustable inertia activated switch and a relay in series and a radio transmitter, all in the towing vehicle where an electrical signal must pass through both the switch and the relay before the towed vehicle brake actuation system is actuated. When the switch and a brake light switch in the towing vehicle are both activated, an electric current passes to the radio transmitter which sends a signal to a radio receiver in a towed vehicle which activates a first towed vehicle relay that permits current to pass on to a towed vehicle adjustable inertia activated switch which upon actuation by towed vehicle deceleration permits current to pass through a second towed vehicle relay to a vacuum valve that is a part of the towed vehicle brake actuation system.

1 Claim, 3 Drawing Sheets

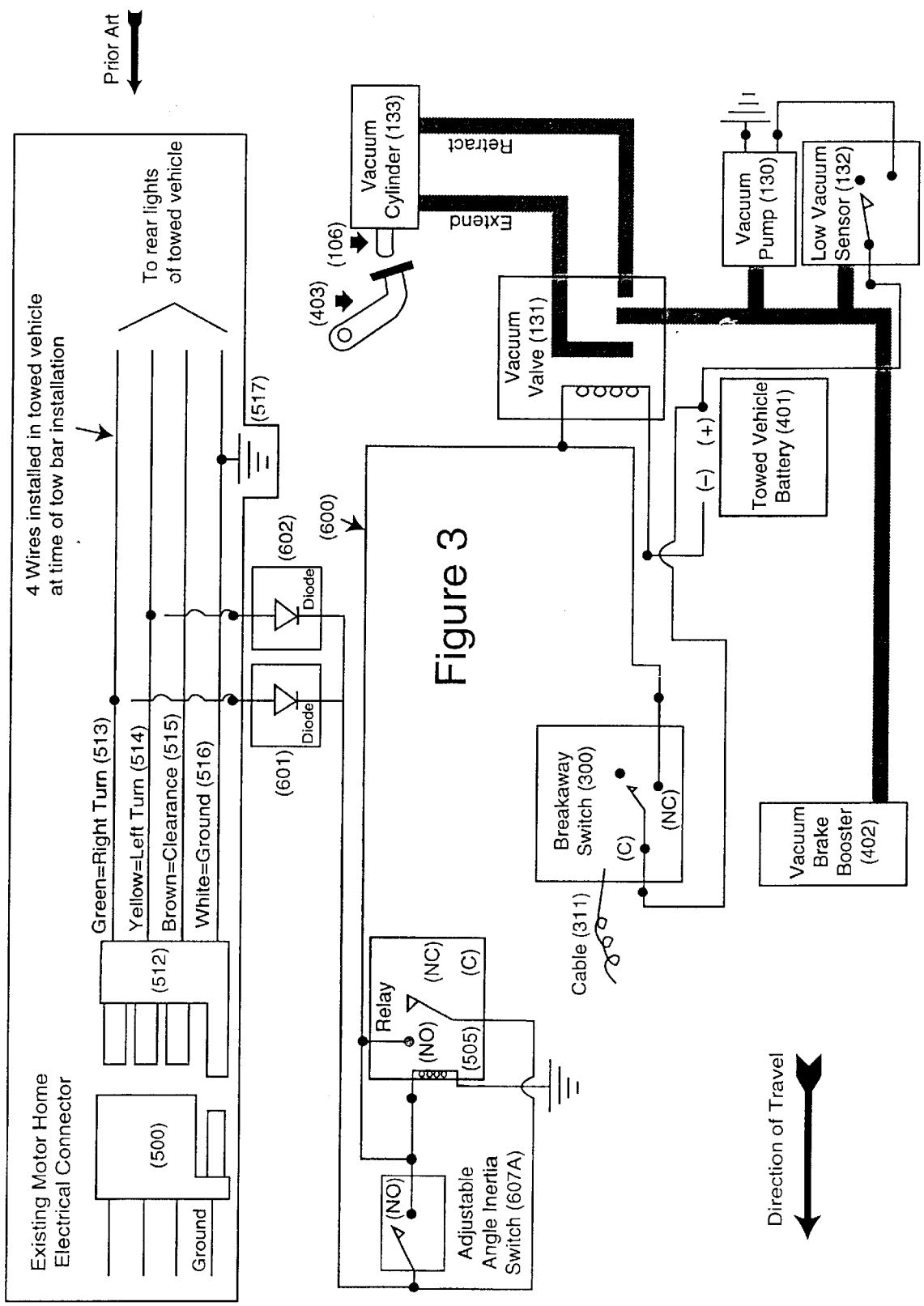

TOWED VEHICLE BRAKE ACTUATION SYSTEM

CROSS REFERENCES TO RELATED APPLICATIONS

U.S. Provisional Application for Patent No. 60/244,163 of Oct. 28, 2000, "Towed Vehicle Brake Actuation System, which is incorporated, by reference, in its entirety.

U.S. Provisional Application for Patent No. 60/287,952 of May 1, 2001, "Towed Vehicle Brake Actuation System Rev. A, which is incorporated, by reference, in its entirety.

U.S. Provisional Application for Patent No. 60/302,486 of Jul. 2, 2001, "Towed Vehicle Brake Actuation System Rev. B, which is incorporated, by reference, in its entirety.

Applicant claims priority of the above Provisional Applications pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

The present invention relates to the use of an inertia switch, which in the preferred embodiment is an adjustable angle inertia switch, in conjunction with electrical signals to actuate a braking system in a towed vehicle such as, but not restricted to an automobile or truck.

The preferred embodiment of the present invention relates to the use of a radio transmitter in a towing vehicle to send a signal to a radio receiver in a towed vehicle to actuate a braking system in the towed vehicle.

The present invention also relates to the use of a radio transmitter in the towed vehicle to send a signal to a radio receiver in the towing vehicle to actuate a light so a driver in the towing vehicle can determine that the braking system in the towed vehicle is engaged.

The present invention also relates to the use of wiring in conjunction with at least one diode in conjuction with the above mentioned inertia switch and electrical signals to actuate the towed vehicle braking system as an alternative to radio transmitters and receivers.

2. Background Information

Applicant's U.S. Pat. No. 6,158,823 of Dec. 12, 2000 works well, but customer feed back indicates that for some driving conditions, it might be desirable to have an adjustment that precludes the towed vehicle brakes from actuating every time the towing vehicle brake pedal is actuated.

Also, the above prior art often mandated electrical connections at the front end of the towing vehicle, often a motor home, that then required as much as 50 feet of cable back to the rear of the towing vehicle and a second jumper cable. The installation of such wiring was considered by many persons too much trouble so they continued to tow their second vehicle without supplemental braking.

As will be seen from the subsequent description of the preferred embodiment of the present invention, the present invention overcomes these and other shortcomings of existing towed vehicle brake actuation systems.

SUMMARY OF THE INVENTION

The preferred embodiment of the present invention comprises a radio receiver, a relay that is actuated by the receiver that permits a current flow to a latching relay that is held engaged, and an inertia switch in a towed vehicle, as well as a radio transmitter that transmits a radio signal when a brake light switch in the towed vehicle is engaged.

The preferred embodiment of the present invention further comprises a radio transmitter in the towing vehicle as well as a radio receiver and a signal light.

In the preferred embodiment of the present invention, when a brake light switch and an adjustable inertia switch are both actuated in the towing vehicle, the radio transmitter in the towing vehicle sends a signal to the radio receiver in the towed vehicle, which activates a relay in the towed vehicle that permits a current flow from a battery in the towed vehicle, said current then engaging the latching relay that is held engaged for the duration of the signal. The inertia switch in the towed vehicle must be engaged for said current to pass on to a vacuum valve which actuates a vacuum cylinder which actuates the brake pedal which actuates the brakes of the towed vehicle. The inertia switch reduces the possibility of radio signals from other sources than the towing vehicle activating the towed vehicles's brake system. As the brakes of the towed vehicle are actuated, the brake light switch of the towed vehicle is activated, which activates the radio transmitter in the towed vehicle which sends a radio signal to the towing vehicle radio receiver which activates a light, such as, but not restricted to, an LED, that permits an operator of the towing vehicle to ascertain that the brake system of the towed vehicle is actuated.

An alternate embodiment of the present invention uses existing wiring instead of a radio signal as is used in the preferred embodiment of the present invention.

BRIEF DESCRIPTION OF THE DRAWINGS

FIG. 3 is a schematic illustrating an alternate embodiment of the present invention applied to a towed vehicle.

DESCRIPTION OF THE PREFERRED EMBODIMENTS

Figure 1:
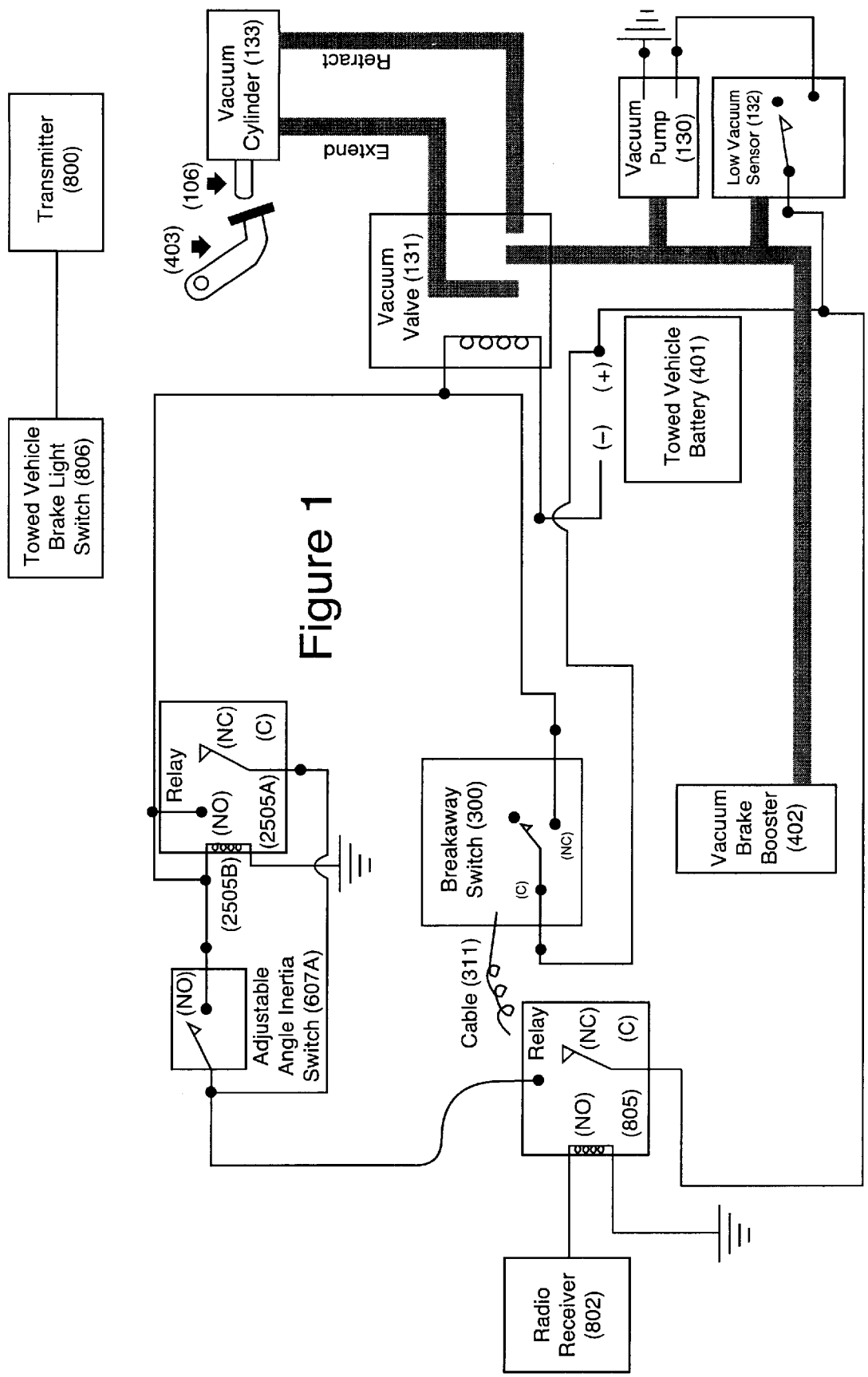
FIG. 1 is a schematic illustrating the preferred embodiments of the present invention applied a towed vehicle.

Referring to FIG. 1 of this application, in the preferred embodiment of the present invention, a towed vehicle brake actuation system comprises a radio receiver 802, a relay 805 that is actuated by said receiver 802, an inertia switch 607A, and a relay 2505A which comprises a coil 2505B which serves to hold the relay 2505A engaged in a current passing mode when a current is applied to the coil 2505B, all pertaining to a towed vehicle, such as, but not restricted to, an automobile or truck being towed by a towing vehicle, such as, but not restricted to, a motor home or recreational vehicle. When the inertia switch 607A is activated by deceleration of the towed vehicle and a signal is received by said receiver 802, the electrical current actuates a vacuum valve 131 which activates a cylinder rod 106 of a vacuum cylinder 133 which actuates a prior art brake pedal 403 which actuates the balance of the towed vehicle's prior art brake system.

The inertia switch 607A reduces the possibilities of radio signals from other sources than the towing vehicle activating the towed vehicle prior art brake system.

The towed vehicle battery 401 supplies current.

There is a breakaway switch 300 with a cable 311 to close said the switch 300 in the event the towed vehicle breaks loose from the towing vehicle so the brake system is actuated to stop the towed vehicle.

Figure 2:
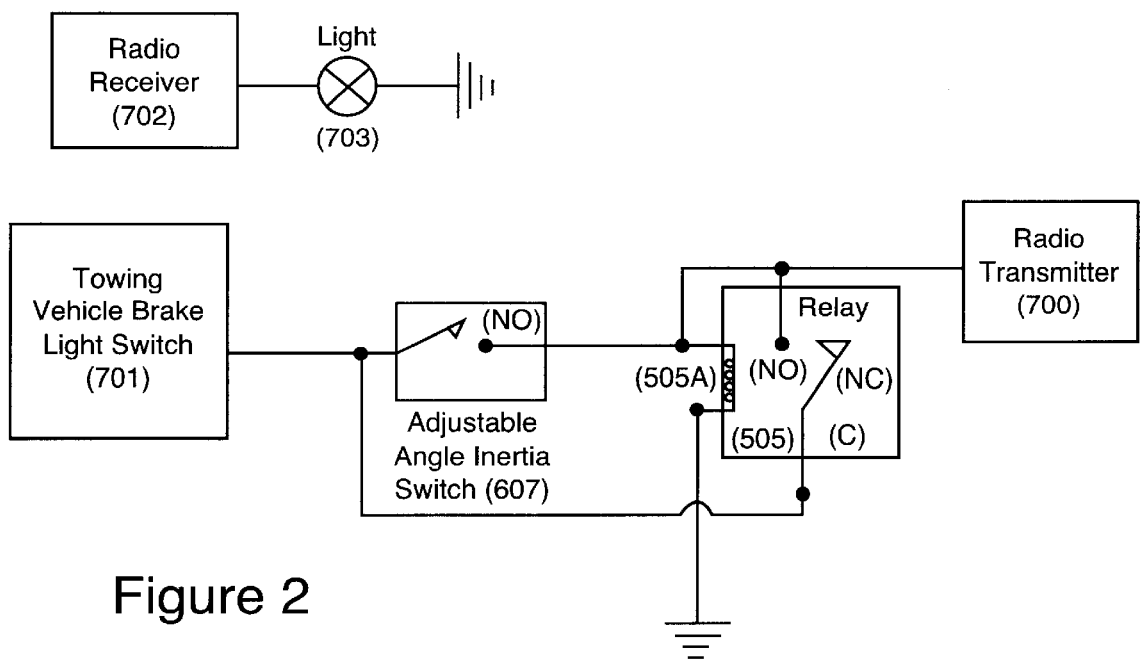
FIG. 2 is a schematic illustrating the preferred embodiments of the present invention applied to a towing vehicle.

The vacuum valve 131, the vacuum cylinder 133, the brake pedal 403, the towed vehicle battery 401, the vacuum brake booster 402, the vacuum pump 130, and the low vacuum sensor 132 are all components of the towed vehicle brake actuation system, also shown in FIG. 2, were also common to applicant's U.S. Pat. No. 6,158,823 of Dec. 12, 2000.

The towed vehicle brake activation system further comprises a radio transmitter 800 such that when the towed vehicle's brake system is actuated, which then actives a brake light switch 806 of the towed vehicle, the radio transmitter 800 sends a signal to a radio receiver 702, (Ref. FIG. 2) in the towing vehicle.

Referring to FIG. 2, a radio transmitter 700 is activated by a current from a signal from a towing vehicle brake light switch 701 transmitted through an inertia switch 607, when the inertia switch 607 is activated by deceleration of the towing vehicle. The inertia switch 607 is tied into the towing vehicle brake light switch 701 to prevent a signal going to the towed vehicle's radio receiver 802, unless both the towing vehicle brake light switch 701 and the inertia switch 607 are activated. Otherwise, signals would be sent in situations other than when one would want the towed vehicle brake system activated.

When both said brake light switch 701 and the inertia switch 607 are activated, a relay 505 which comprises a coil 505A is activated, the radio transmitter 700 sends a signal to the radio receiver 802 in the towed vehicle which commences to act on the towed vehicle brake actuation system as previously described.

The coil 505A holds the relay 505 in a current passing condition until said brake light switch 701 is open, i.e. in a non current passing condition. This is to minimize brake chatter.

In the preferred embodiment of the present invention, the inertia switches 607 and 607A, are adjustable inertia switches. An example of an adjustable inertia switch would be a mercury inertia switch, mounted so it can be rotated to adjust the amount of deceleration required to activate. This permits adjustments by a driver of the towing vehicle to levels of deceleration desired both to send a signal from the towing vehicle and to process a signal received in the towed vehicle.

Requiring both the inertia switch 607 and the relay 505 to act concurrently prior to a signal being passed permits the operator, by adjustment of said switch 607 to control system sensitivity. Also, the coil 505A in the relay 505, by holding the relay closed, minimizes brake system chatter, ensuring a more steady signal to the radio transmitter of the towing vehicle.

Normally, once set, the inertia switch 607A in the towed vehicle should rarely require adjustment.

The towed vehicle brake actuation system, in the preferred embodiment of the present invention, in the towing vehicle, further comprises a radio receiver 702 which receives a signal from the radio transmitter 800 in the towed vehicle which activates a light 703, such as, but not restricted to, an LED, said light 703 permitting an operator of the towing vehicle to determine when the brakes of the towed vehicle are engaged.

As shown in FIG. 3, conventional towed vehicle light wiring starts with a female 4-wire connector 500 at the rear of a towing vehicle, such as, but not restricted to, a towing recreational vehicle, such as, but not restricted to, a motor home. A typical towing package wiring system for a towed vehicle would consist of a male 4-wire connector 512 with four wires to the rear lights of a towed vehicle consisting of a green wire 513, to a right rear brake light; a yellow wire 514 to a left rear brake light; a brown wire 515 to running lights, and a white wire 516 which is a ground wire.

In an alternate preferred embodiment of the present invention, the towed vehicle brake actuation system 600 comprises a first diode 601 and a second diode 602, the inertia switch 607, and the relay 505. A ground 517 is added to the white wire 516 to enhance reliability. There is an existing ground of the white wire 516 through the towed vehicle's existing trailer hitch, but if said hitch is rusty, it isn't sufficiently reliable as a ground for the present invention.

The first diode 601 is connected electrically to the green wire 513 to the right rear brake light.

The second diode 602 is connected electrically to the yellow wire 514 to the left rear brake light.

When towing vehicle brakes are applied, and an electrical signal is passed to the brake lights, the electrical signal is also passed through either or both of said diodes 601 and 602 to the inertia switch 607. If deceleration forces are sufficient, the inertia switch 607 is activated, passing the electrical signal to the coil 505A of the relay 505, which latches the relay 505 in a current passing mode, permitting the electrical signal to pass on to the vacuum valve 131, thereby actuating the towed vehicle's brake system. Chattering of the inertia switch 607 is avoided by the relay 505 by the coil 505A of the relay 505 latching the relay 505 into the current passing mode, as long as, but no longer than, the initial signal from one or both of said diodes 601 and 602 is activated.

Said diodes 601 and 602 prevent the crossing of the turn signals in the towing vehicle.

When an operator of a towing vehicle takes a foot off a towing vehicle brake pedal, the electrical signal ceases, the relay 505 releases, and the vacuum valve 131 causes the towed vehicle brake pedal 403 to be retracted.

In the alternate preferred embodiment, there is minimal chance of false activation of the towed vehicle braking system either by the towing vehicle's turn signals, emergency flashers, or the inertia switch 607, since it takes an electrical signal from either of the green wire 503 or the yellow wire 504 in combination with activation of the inertia switch 607 to cause the towed vehicle brakes to be applied.

The relay 505 and the inertia switch 607 are in series, so when both are energized, i.e. in a current passing condition, current from towing vehicle brake light wiring actuates the vacuum valve 131 which in turn allows vacuum from a vacuum reservoir of a power brake booster 402 to cause a vacuum cylinder 133 to extend its cylinder rod to move the brake pedal 403 of the towed vehicle, applying the towed vehicle's brakes.

The right and left turn signal wires 513 and 514 are energized by the towing vehicle's brake light switch (not shown). The turn signal wiring, connected to the towing vehicle through the 4-wire female connector 512 is tapped to energize relay 505, through either or both of the diodes 601 and 602, from either of the towing vehicle's turning signal lights to the towed vehicle's brake lights.

The inertia switch 607 is activated by inertia as the towing vehicle begins to decelerate, permitting current from the towed vehicle battery 401 to pass from the inertia switch 607 through the relay 505, if the relay 505 is energized from the towing vehicle's brake lights.

If relay 505 is energized and the inertia switch 607 is activated, current will energize the vacuum valve 131, allowing vacuum to cause the vacuum cylinder 133 to extend its cylinder rod 106 to move the towed vehicle brake pedal 403, applying the towed vehicle's brakes.

As the vacuum cylinder rod 106 extends, using vacuum, the drop in vacuum will be sensed by the low vacuum sensor 132 which will permit current to pass through the low vacuum sensor 132 to the vacuum pump 130 which will pump until a previously set vacuum level is achieved and sensed by the low vacuum sensor 132 at which time the pump 130 will be turned off by the low vacuum switch 132.

The vacuum brake booster 402 is in vacuum communication with the low vacuum sensor 132, the vacuum pump 130, and the vacuum valve 131 to energize the towed vehicle power brakes.

In the event the towed vehicle should become separated, i.e., breaks away, from the towing vehicle, a cable 311 connected to the towing vehicle as well as to the breakaway switch 300, will activate the breakaway switch 300 permitting current to flow to the vacuum valve 131, bypassing the inertia switch 607 and relay 505 directly energizing vacuum valve 131, causing cylinder rod 106 to actuate the brake pedal, applying the brakes of the towed vehicle.

Although the description above contains many specificities, these should not be construed as limiting the scope of the invention but as merely providing illustration of some of the presently preferred embodiments of this invention.

For example, vacuum brake system componentry were used to illustrate the preferred embodiments of the present invention. However, the preferred embodiments of the invention are not restricted to vacuum brake systems, as the invention is also applicable to other brake systems, such as, but not restricted to pneumatic and hydraulic brake systems.

Also, the invention illustrates a cylinder rod pushing on a brake pedal. However, the invention is also applicable to cylinder rods or cables pulling on a brake pedal or lever.

Also, the inertia switches 607 and 607A in the preferred embodiment are mercury switches, however cylinders containing a movable ball or other contacting mechanism wherein such switch is mounted to allow rotation about a specific axis to a given angle might serve the same purpose.

Also, an inertia switch might have some other means of adjustment of deceleration to serve the same purpose.

Also, an inertia switch that is not adjustable would be of some value, albeit not as useful as an adjustable inertia switch.

As will be obvious to those skilled in the art that modifications may be made to the embodiments described above without departing from the scope of the present invention. Thus the scope of the invention should be determined by the appended claims in the formal application and their legal equivalents rather than by the examples given.

I claim:

1. A towed vehicle brake actuation system comprising:

a) a towing vehicle adjustable inertia activated switch;

b) a towing vehicle relay in series with the towing vehicle adjustable inertia activated switch; and c) a radio transmitter in the towing vehicle;

wherein an electrical signal must pass through both the towing vehicle adjustable inertia activated switch and the towing vehicle relay before the towed vehicle brake actuation system is actuated;

wherein said towing vehicle adjustable inertia activated switch is mounted so that an amount of deceleration required to activate said towing vehicle adjustable inertia activated switch can be adjusted by rotating said towing vehicle adjustable inertia activated switch about its mounting;

wherein when said towing vehicle adjustable inertia activated switch is activated, and a brake light switch in the towing vehicle is activated, an electrical current passes through both said towing vehicle adjustable inertia activated switch and the towing vehicle relay to said radio transmitter in said towing vehicle, said radio transmitter then sends a signal to a radio receiver in a towed vehicle which activates a first towed vehicle relay that permits current to pass on to a towed vehicle adjustable inertia activated switch, which, upon actuation by deceleration of the towed vehicle, permits current to pass through a second towed vehicle relay to a vacuum valve, the vacuum valve being a part of said towed vehicle brake actuation system.

* * * * *